US007983606B2

(12) United States Patent
Cho

(10) Patent No.: US 7,983,606 B2
(45) Date of Patent: Jul. 19, 2011

(54) TRANSFER BELT DRIVING CONTROL METHOD AND TRANSFER BELT DRIVING CONTROL APPARATUS FOR COLOR REGISTRATION CORRECTION

(75) Inventor: Myong-hun Cho, Suwon-si (KR)

(73) Assignee: SAMSUNG Electroncis Co., Ltd., Suwon-si (KR)

( * ) Notice: Subject to any disclaimer, the term of this patent is extended or adjusted under 35 U.S.C. 154(b) by 159 days.

(21) Appl. No.: 12/391,391

(22) Filed: Feb. 24, 2009

(65) Prior Publication Data

US 2009/0290914 A1 Nov. 26, 2009

(30) Foreign Application Priority Data

May 23, 2008 (KR) ........................ 10-2008-0048244

(51) Int. Cl.
*G03G 15/01* (2006.01)
*B41J 2/385* (2006.01)
*G01D 15/06* (2006.01)

(52) U.S. Cl. ........................................ 399/301; 347/116

(58) Field of Classification Search ................ 399/9, 24, 399/31, 38, 66, 101, 301; 347/116
See application file for complete search history.

(56) References Cited

U.S. PATENT DOCUMENTS 7,327,977 B2 * 2/2008 Kitazawa et al. ............ 399/301

FOREIGN PATENT DOCUMENTS

JP 2000-137367 * 5/2000
JP 2003-036012 * 2/2003

* cited by examiner

*Primary Examiner* — Sandra L Brase
(74) *Attorney, Agent, or Firm* — Stanzione & Kim, LLP

(57) ABSTRACT

A transfer belt driving control method and transfer belt driving control apparatus for color registration correction. The color registration correction method and apparatus performs the color registration correction by setting a pattern forming section, in which patterns for the color registration correction are able to be formed, and a non-pattern forming section, in which the patterns are not able to be formed, on a transfer belt in which the patterns are formed, performing the color registration correction by driving the transfer belt at a first speed in the pattern forming section, and driving the transfer belt at a second speed, which is faster than the first speed, in the non-pattern forming section.

19 Claims, 5 Drawing Sheets

TRANSFER BELT DRIVING CONTROL METHOD AND TRANSFER BELT DRIVING CONTROL APPARATUS FOR COLOR REGISTRATION CORRECTION

CROSS-REFERENCE TO RELATED APPLICATIONS

This application claims priority under 35 U.S.C. §119 from Korean Patent Application No. 10-2008-0048244, filed on May 23, 2008, in the Korean Intellectual Property Office, the disclosure of which is incorporated herein in its entirety by reference.

BACKGROUND OF THE INVENTION

1. Field of the Invention

The present general inventive concept relates to a transfer belt driving control method and transfer belt driving control apparatus for color registration correction, and more particularly, to a method and apparatus to control a driving speed of a transfer belt when color registration correction is performed.

2. Description of the Related Art

FIG. 1 is a schematic diagram of an electro-photographic printer to which a conventional color registration correction method is applied.

In general, as illustrated in FIG. 1, the electro-photographic printer such as a color laser printer includes four image forming units 100, 102, 104, and 106 respectively corresponding to four colors such as black (K), yellow (Y), magenta (M), and cyan (C), a sensor unit 110 for performing registration, and a transfer belt 120. The four image forming units 100, 102, 104, and 106 form patterns for color registration correction on the transfer belt 120, the sensor unit 110 senses the patterns formed on the transfer belt 120, and color registration correction is performed on the basis of the sensed patterns. The color registration correction requires a process to drive the transfer belt 120. Conventionally, when the transfer belt 120 is driven at a normal speed according to the process, there occurs a problem that a much longer time is taken to completely perform the color registration correction. On the other hand, if the transfer belt 120 is driven at a faster speed than the normal speed, an error occurs when the patterns are formed and then are sensed, and thus a problem is caused in that the color registration correction may not be accurately performed.

SUMMARY OF THE INVENTION

The present general inventive concept provides a transfer belt driving control method for accurate color registration correction in a short time.

The present general inventive concept also provides a computer readable recording medium having recorded thereon a computer program for executing the method.

The present general inventive concept also provides an apparatus and method to accurately perform color registration correction in a short period of time.

Additional aspects and utilities of the present general inventive concept will be set forth in part in the description which follows and, in part, will be obvious from the description, or may be learned by practice of the general inventive concept.

In an embodiment and utilities of the present general inventive concept, there is provided a transfer belt driving control method for color registration correction, the method including setting a pattern forming section, in which patterns for the color registration correction are able to be formed, and a non-pattern forming section, in which the patterns are not able to be formed, on a transfer belt in which the patterns are formed, performing the color registration correction by driving the transfer belt at a first speed in the pattern forming section, and driving the transfer belt at a second speed, which is faster than the first speed, in the non-pattern forming section.

In an embodiment and utilities of the present general inventive concept, there is also provided a computer readable recording medium having recorded thereon a computer program to execute the transfer belt driving control method.

In an embodiment and utilities of the present general inventive concept, there is also provided a transfer belt driving control apparatus for color registration correction, the apparatus including a pattern forming section setting unit to set a pattern forming section, in which patterns for the color registration correction are able to be formed, and a non-pattern forming section, in which the patterns are not able to be formed, on a transfer belt in which the patterns are formed, image forming units to form the patterns in the pattern forming section, and a control unit to drive the transfer belt at a first speed when the image forming units form the patterns in the pattern forming section, and driving the transfer belt at a second speed in the non-pattern forming section.

In an embodiment and utilities of the present general inventive concept, there is also provided a computer-readable medium to contain computer-readable codes as a program to perform a method of an image forming apparatus, the method including setting a pattern forming section, in which patterns for the color registration correction are able to be formed, and a non-pattern forming section, in which the patterns are not able to be formed, on a transfer belt in which the patterns are formed, performing the color registration correction by driving the transfer belt at a first speed in the pattern forming section, and driving the transfer belt at a second speed, which is faster than the first speed, in the non-pattern forming section.

In an embodiment and utilities of the present general inventive concept, there is also provided an image forming method including forming one or more patterns for color registration on a pattern forming section of a transfer belt; and controlling the transfer belt to move at a first speed when the patterns are formed on the pattern forming section and to move at a second speed when the patterns are not formed.

The image forming method may further include detecting one or more noises of the transfer belt, and setting the pattern forming section according to a length of the adjacent noises.

In an embodiment and utilities of the present general inventive concept, there is also provided an image forming apparatus including a transfer belt, one or more image forming units to form one or more patterns for color registration on a pattern forming section of a transfer belt, and a control unit to control the transfer belt to move at a first speed when the patterns are formed on the pattern forming section and to move at a second speed when the patterns are not formed.

The image forming apparatus may further include a detector to detect one or more noises of the transfer belt, and the control unit may set the pattern forming section according to a length of the adjacent noises.

In an embodiment and utilities of the present general inventive concept, there is also provided an image forming apparatus including a transfer belt, and a control unit to control the transfer belt to move at least two different speeds during a pattern forming process on the transfer belt.

In an embodiment and utilities of the present general inventive concept, there is also provided an image forming apparatus including a transfer belt, and a control unit to control the transfer belt to move at least two different speeds according to an existence of one or more noises, a location of a pattern forming section, and a location of a non-pattern forming section of the transfer belt.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
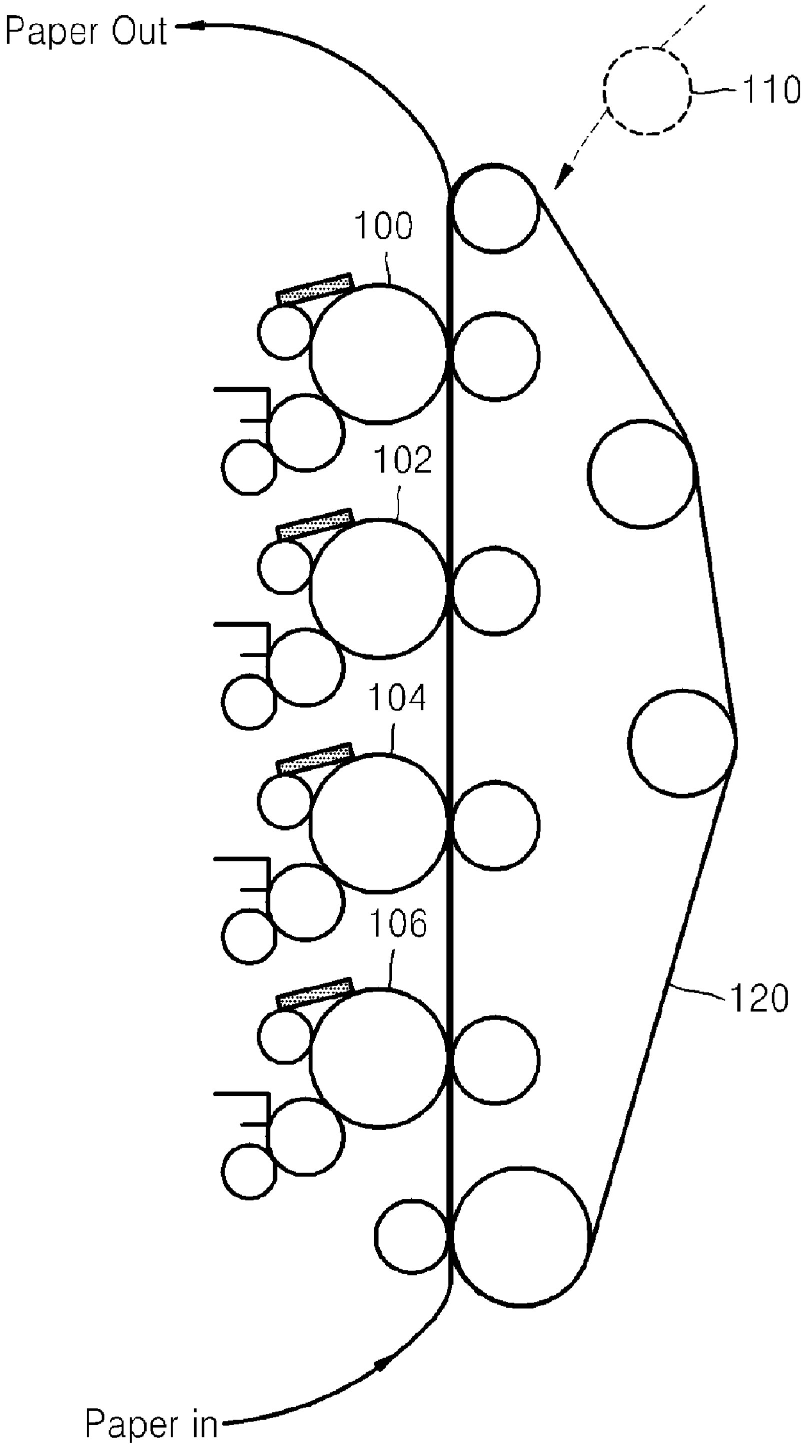
FIG. 1 (RELATED ART)
FIG. 1 is a schematic diagram of an electro-photographic printer to which a conventional color registration correction method is applied.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
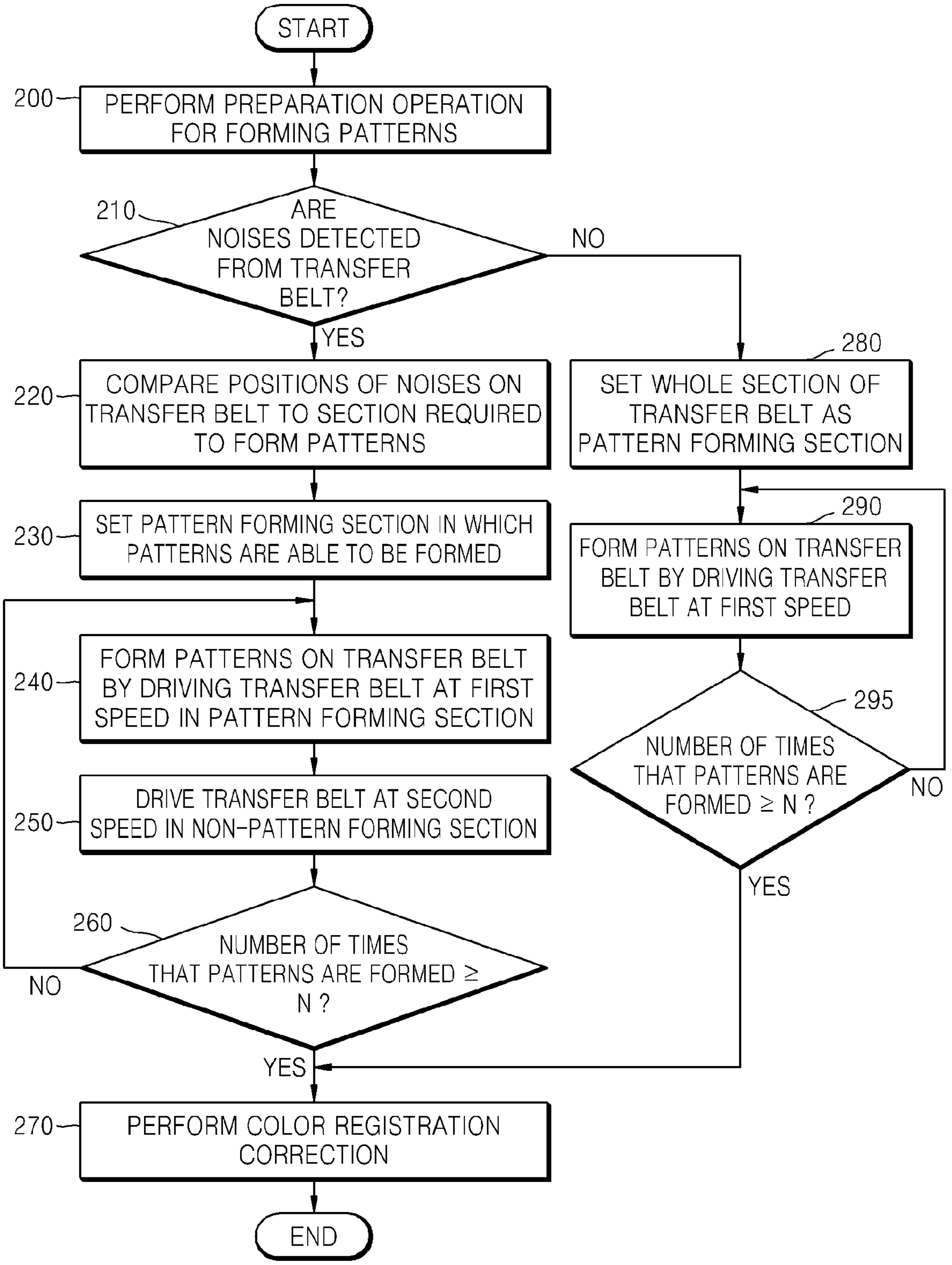
FIG. 2 is a flowchart illustrating a transfer belt driving control method for color registration correction according to an embodiment of the present general inventive concept.

FIG. 2 is a flowchart illustrating a transfer belt driving control method for color registration correction, according to an embodiment of the present general inventive concept.

The transfer belt driving control method can be implemented in an image forming apparatus. The color registration correction can be obtained from a pattern image forming process to form one or more patterns on a transfer belt of the image forming apparatus using one or more image forming units and can be applied to the one or more image forming units of the image forming apparatus to perform a next image forming process without errors in registration of one or more images formed on the transfer belt, thereby reducing or eliminating one or more errors in color image registration of a printed output of the image forming apparatus.

Referring to FIG. 2, in operation 200, a preparation for forming patterns for color registration correction is performed. In other words, when a color registration correction procedure begins, a preparation operation of forming the patterns for color registration correction is performed. In more detail, the preparation operation includes cleaning the transfer belt using a cleaning device (not illustrated), applying a high voltage to the transfer belt using a charging device (not illustrated), printing a transfer belt cleaning device protection pattern on the transfer belt using one or more pattern forming devices (not illustrated), and idling the transfer belt to remove noises caused by mechanical characteristics of the transfer belt. In this case, the transfer belt is driven at a second speed that is faster than a first speed, which is a normal speed of driving the transfer belt to form an image thereon.

In operation 210, it is determined whether noises are detected from the transfer belt. The noises, which are inferior surface portions of the transfer belt, may exist on the transfer belt due to various reasons such as mechanical characteristics of the transfer belt or a user's carelessness. The noises that are formed on a surface of the transfer belt are not distinguished from the patterns when the noises are detected, and thus the noises disturb the performing of the color registration correction. When the noises are detected from the transfer belt, if the patterns for the color registration correction are formed on positions from which the noises are detected, the patterns may not be easily distinguished from the noises and thus the color registration correction may not be accurately performed. Accordingly, the patterns are required to be formed in a section where the noises are not detected. In operation 210, a sensor may determine whether the noises are detected from the transfer belt by driving the transfer belt. In this case, the sensor may determine whether the noises are detected from the transfer belt after the transfer belt is repeatedly driven one or more times. Also, the sensor may also determine whether the noises are detected from the transfer belt by repeatedly driving the transfer belt one or more times. The method proceeds to operation 220 if at least one noise is detected from the transfer belt, or proceeds to operation 280 if the noises are not detected from the transfer belt.

In operation 220, one or more positions of the noises are compared to a section required to form the patterns on the transfer belt.

Figure 3A:
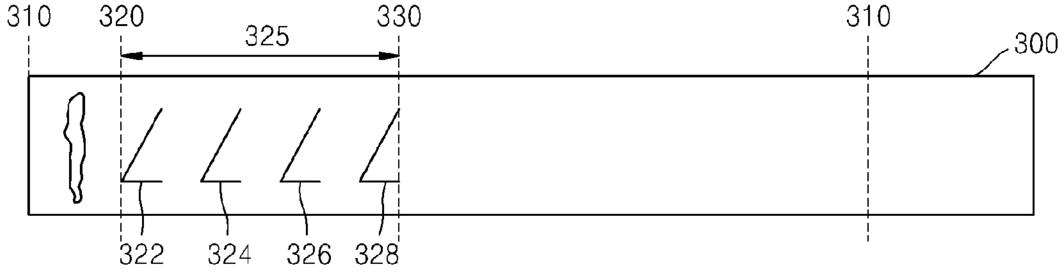
FIG. 3A is a diagram illustrating a section required to form patterns on transfer belt according to an embodiment of the present general inventive concept.

FIG. 3A is a diagram illustrating a pattern forming section 325 required to form patterns on a transfer belt 300 according to an embodiment of the present general inventive concept;

The transfer belt 300 has a belt shape and a flat surface, in which end portions are connected to each other. The transfer belt 300 are illustrated as if the end portions thereof are separated from each other, and thus a virtual start point 310 is repeated at a position where the end portions thereof meet. In other words, although there is actually one virtual start point 310 on the transfer belt 300 when the transfer belt 300 is driven, the same patterns are repeatedly illustrated for the explanation and illustration purposes, and thus the virtual start point 310 is illustrated twice on the transfer belt 120 in FIG. 3A.

Referring to FIG. 1, the four image forming units 100, 102, 104, and 106 may form patterns for color registration correction on the transfer belt 120. Here, the four image forming units 100, 102, 104, and 106 for respectively forming black (K), yellow (Y), magenta (M), and cyan (C) colors may form the patterns for color registration correction on the transfer belt 120. In this case, as illustrated in FIGS. 3A, K, Y, M, and C images 322, 324, 326, and 328 may be formed on the transfer belt 300. Since four images, such as the K, Y, M, and C images 322, 324, 326, and 328, are formed on the transfer belt 300, a section is required to form four patterns, from a start position 320 of the K image 322, which is firstly formed, to an end position 330 of the C image, which is lastly formed. As described above, the section required to form the patterns is referred to as the pattern forming section 325.

Figure 3B:
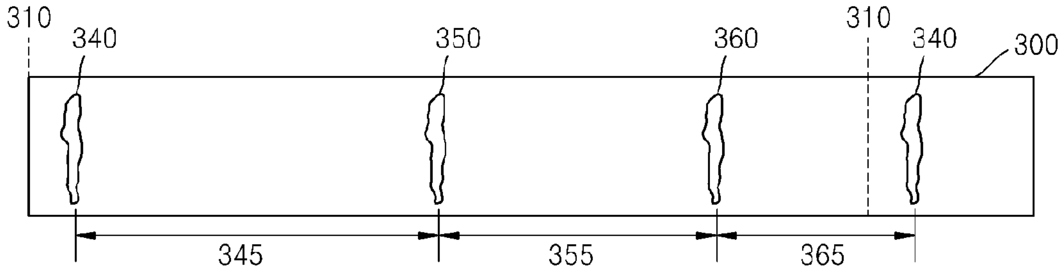
FIG. 3B is a diagram illustrating noise existing on a transfer belt according to an embodiment of the present general inventive concept.

FIG. 3B is a diagram illustrating noises 340, 350, and 360 existing on the transfer belt 300 illustrated in FIG. 3A, according to an embodiment of the present invention. FIG. 3B will be described in conjunction with FIG. 3A.

Referring to FIG. 3B, three noises, such as the noises 340, 350, and 360, may exist on the transfer belt 300. However, an embodiment of the present general inventive concept is not limited thereto and four or more noises may exist on the transfer belt 300.

The noises can be generated from a portion or surface of the transfer belt 300, a contact between the transfer belt 300 and a roller unit rotating the transfer belt 300, or an interaction between the transfer belt 300 and one or more adjacent elements of an image forming apparatus. When the noises are detected or sensed, locations of the respective noises can be detected, sensed, or determined with respect to a reference position of the transfer belt 300. When a sensor (detector) detects the noises from the transfer belt 300, a control unit receives the noises from the sensor and can determine the relative locations of the respective noises.

Referring back to FIG. 2, operation 220 will now be described in detail with reference to FIGS. 3A and 3B. In operation 220, the positions of the noises 340, 350, and 360 are compared to the pattern forming section 325. It is determined whether the pattern forming section 325 is included between neighboring noises on the transfer belt 300. In other words, it is determined whether the pattern forming section 325 is included in a section A 345 between the noises 340 and 350, in a section B 355 between the noises 350 and 360, or in a section C 365 between the noises 360 and 340.

The pattern forming section 325 has a length along a surface of the transfer belt 300 so that a required number of pattern images can be formed within the length of the pattern forming section 325. Therefore, a length between the neighboring noises can be compared to the length of the pattern forming section 325, so that a span or area corresponding to the length of the neighboring noises can be used as the pattern forming section 325.

If any length between the neighboring noises is not longer than the length of the pattern forming section 325, it is possible that the longest one of the lengths of the neighboring noises can be selected for the pattern forming section 325.

In operation 230, a pattern forming section, in which the patterns may be formed, is set. In other words, a section required to form the patterns, which is included between neighboring noises, is set as the pattern forming section in which the patterns may be formed. Referring to FIGS. 3A and 3B, the pattern forming section 325 is included only in the section A 345, and is neither included in the section B 355 nor in the section C 365. Thus, the pattern forming section 325 that is included in the section A 345 is set. Also, sections B and C in which the patterns may not be formed are set as a non-pattern forming section. Furthermore, if two or more sections, in which the patterns may be formed, exist, a section that is selected by a user or a section that is disposed at a front position of the transfer belt 300 close to the left side virtual start point 310 is set as the pattern forming section.

Figure 3C:
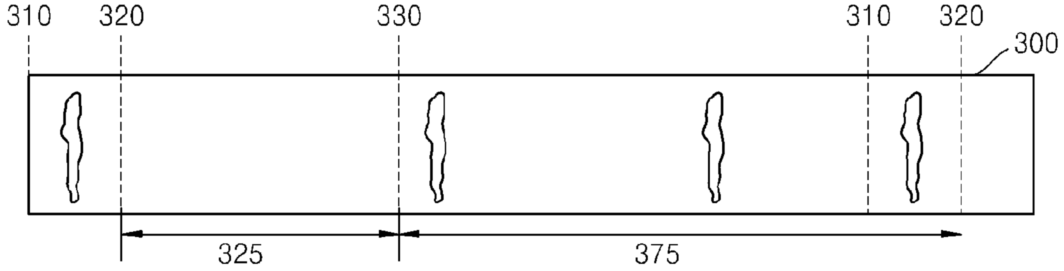
FIG. 3C is a diagram illustrating a pattern forming section when noise exists on a transfer belt according to an embodiment of the present general inventive concept.

FIG. 3C is a diagram illustrating a pattern forming section when noises exist on the transfer belt 300 illustrated in FIGS. 3A and 3B, according to an embodiment of the present general inventive concept. FIG. 3C will be described in conjunction with FIGS. 3A and 3B.

Referring to FIG. 3C, the pattern forming section 325 that is included in the section A 345, is set as a section in which the patterns may be formed.

Referring back to FIG. 2, in operation 240, the patterns are formed by driving the transfer belt at the first speed in the pattern forming section. The noises do not exist in the pattern forming section and thus the patterns corresponding to four colors may be formed. Accordingly, the patterns are formed in the pattern forming section by driving the transfer belt at the first speed in the pattern forming section. In this case, the first speed is the normal speed of driving the transfer belt and may be differently set in accordance with the performance of a printer or image forming apparatus.

In operation 250, the transfer belt is driven at the second speed in a non-pattern forming section. Referring to FIG. 3C, the transfer belt 300 is driven at the second speed in a non-pattern forming section 375. In this case, the second speed is faster than the first speed that is the normal speed of driving the transfer belt 300 and may be differently set in accordance with the performance of the printer or image forming apparatus. The patterns are not formed in the non-pattern forming section 375 and thus, although the transfer belt 300 is driven at the second speed, which is faster than the first speed that is the normal speed of driving the transfer belt 300, accurate color registration correction is not affected. Also, the time taken for the color registration correction may be reduced.

Figure 3D:
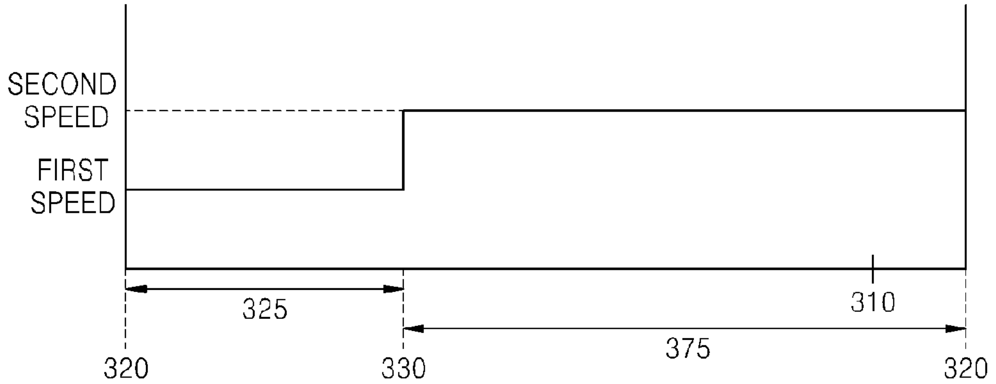
FIG. 3D is a diagram illustrating a driving speed of a transfer belt according to an embodiment of the present general inventive concept.

FIG. 3D is a diagram showing a driving speed of the transfer belt 300 illustrated in FIGS. 3A, 3B, and 3C, according to an embodiment of the present general inventive concept. FIG. 3D will be described in conjunction with FIGS. 3A, 3B, and 3C.

Referring to FIG. 3D, the transfer belt 300 is driven at the first speed in the pattern forming section 325 in which patterns are formed on the transfer belt 300, and is driven at the second speed in the non-pattern forming section 375.

Referring back to FIG. 2, in operation 260, it is determined whether the number of times that the patterns are formed on the transfer belt is equal to or greater than a preset number N. Since the transfer belt has a belt shape and a flat surface where a start portion and an end portion are connected to each other when the transfer belt is driven, the same patterns are repeatedly formed or illustrated along the transfer belt 300. In this case, if the transfer belt that begins to be driven at a virtual start point 310 illustrated in FIGS. 3A through 3C, returns to another virtual start point 310, the forming of the patterns in operation 240 is performed once. In operation 260, it is determined whether the number of times that the patterns are formed on the transfer belt is equal to or greater than the preset number N that is set in order to accurately perform the color registration correction. If the number of times that the patterns are formed on the transfer belt is less than the preset number N, the method returns to operation 240. Otherwise, the method proceeds to operation 270. In order to accurately perform the color registration correction, the forming of the patterns on the transfer belt needs to be repeatedly performed. Thus, the transfer belt is repeatedly driven until the number of times that the patterns are formed on the transfer belt is equal to or greater than the preset number N that is set in order to accurately perform the color registration correction.

In operation 270, the color registration correction is performed. In other words, the driving of the transfer belt is paused, and the color registration correction is performed on the basis of the patterns formed on the transfer belt. A sensor can be used to detect the pattern from the transfer belt and a control unit can determine errors in registration of the patterns (color images) corresponding to the respective image forming units) such that the control unit can correct the color registration by controlling the image forming units and the transfer belt to obtain a color image without color registration error. Also, the pattern forming section, the non-pattern forming section, and a driving speed of the transfer belt in each section may be displayed on a display device mounted on or connectable to the image forming apparatus.

In operation 280, a whole section of the transfer belt is set as the pattern forming section. If the noises do not exist on the transfer belt, the patterns for color registration correction may be formed in the whole section of the transfer belt. Thus, the whole section of the transfer belt is set as the pattern forming section in which the patterns may be formed.

In operation 290, the patterns are formed on the transfer belt by driving the transfer belt at the first speed. If the noises are not detected from the transfer belt, the whole section of the transfer belt is the pattern forming section in which the patterns may be formed. Thus, the patterns are formed on the transfer belt by driving the transfer belt at the first speed that is the normal speed of driving the transfer belt.

In operation 295, it is determined whether the number of times that the patterns are formed on the transfer belt is equal to or greater than a preset number N. Since the transfer belt has a belt shape and a flat surface where a start portion and an end portion of the transfer belt are connected to each other when the transfer belt is driven, the same patterns are repeatedly formed or illustrated. In this case, if the transfer belt that begins to be driven at the virtual start point 310 illustrated in FIGS. 3A through 3C, returns to the virtual start point 310, the forming of the patterns in operation 290 is performed once. In operation 295, it is determined whether the number of times that the patterns are formed on the transfer belt is equal to or greater than the preset number N that is set in order to accurately perform the color registration correction. If the number of times that the patterns are formed on the transfer belt is less than the preset number N, the method returns to operation 290. Otherwise, the method proceeds to operation 270.

Figure 4:
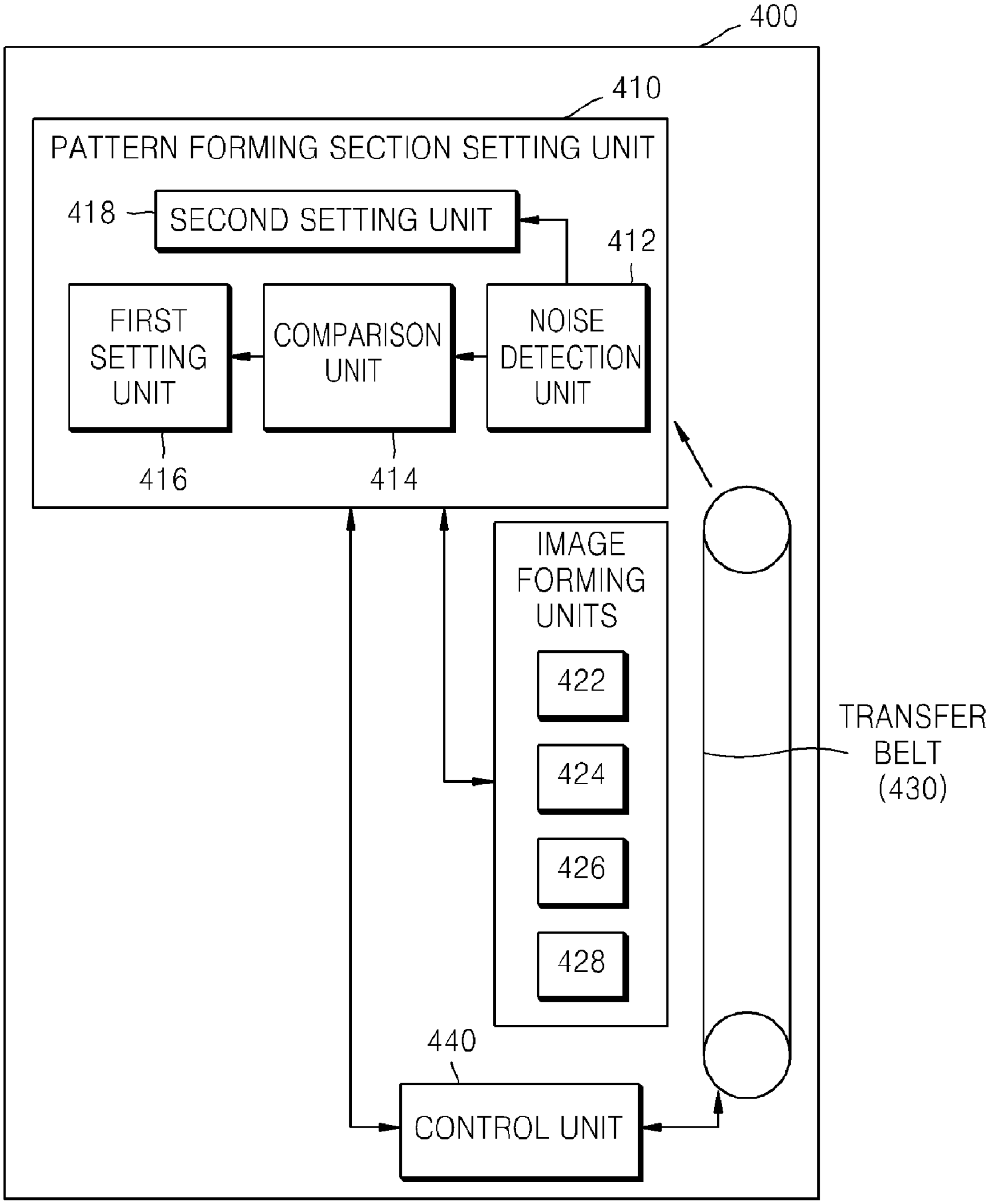
FIG. 4 is a block diagram illustrating a transfer belt driving control apparatus for color registration correction according to an embodiment of the present general inventive concept.

FIG. 4 is a block diagram illustrating a transfer belt driving control apparatus 400 for color registration correction, according to an embodiment of the present general inventive concept.

Referring to FIG. 4, the transfer belt driving control apparatus 400 includes a pattern forming section setting unit 410, image forming units 422, 424, 426, and 428, a transfer belt 430, and a control unit 440.

The pattern forming section setting unit 410 sets a pattern forming section in which patterns for the color registration correction may be formed, and a non-pattern forming section in which the patterns may not be formed, on the transfer belt 430 that is used for the color registration correction.

In more detail, the pattern forming section setting unit 410 includes a noise detection unit 412, a comparison unit 414, a first setting unit 416, and a second setting unit 418.

The noise detection unit 412 detects noises, which are inferior surface portions, from the transfer belt 430. If the noises are detected from the transfer belt 430, the noise detection unit 412 notifies the comparison unit 414 of the noises. Otherwise, if the noises are not detected from the transfer belt 430, the noise detection unit 412 notifies the second setting unit 418 of the non-noise state.

If at least one noise is detected from the transfer belt 430, the comparison unit 414 compares positions of neighboring (or adjacent) noises on the transfer belt 430 to a section required to form the patterns. Referring to FIGS. 3A and 3B, the comparison unit 414 compares the pattern forming section 325 that is illustrated in FIG. 3A, to the section A 345, the section B 355, and the section C 365, which are illustrated in FIG. 3B and are sections between neighboring noises, in order to determine whether the pattern forming section 325 is included in the section A 345, the section B 355, and the section C 365. The comparison unit 414 transmits a determination result to the first setting unit 416. As described above, lengths (distances) of the neighboring noises are compared to a required length of patterns formed in the pattern forming section 325.

If the pattern forming section 325 is included between neighboring noises, the first setting unit 416 sets a section in which the pattern forming section 325 is included, as a pattern forming section. In FIGS. 3A and 3B, the pattern forming section 325 is included in the section A 345, and thus the pattern forming section 325 is set as illustrated in FIG. 3C.

Referring to FIG. 2, the second setting unit 418 sets a whole section of the transfer belt 430 as the pattern forming section. If the noises are not detected from the transfer belt 430, the patterns may be formed in the whole section of the transfer belt 430. Thus, the second setting unit 418 is notified by the noise detection unit 412 that the noises are not detected from the transfer belt 430, and the whole section of the transfer belt 430 is set as the pattern forming section.

The image forming units 422, 424, 426, and 428 form images in the pattern forming section set by the pattern forming section setting unit 410. In more detail, the image forming units 422, 424, 426, and 428 which respectively correspond to four colors, such as black (K), yellow (Y), magenta (M), and cyan (C), form the images in the pattern forming section.

The control unit 440 controls a driving speed of the transfer belt 430. In more detail, when the image forming units 422, 424, 426, and 428 are controlled by the control unit 440 according to the pattern forming section to form the patterns in the pattern forming section of the transfer belt 430, the control unit 440 drives the transfer belt 430 at a first speed, a normal speed of driving the transfer belt 430. Also, when the image forming units 422, 424, 426, and 428 do not form the patterns in the non-pattern forming section of the transfer belt 430, the control unit 440 drives the transfer belt 430 at a second speed that is faster than the first speed. In this case, each of the first and second speeds is set in accordance with a printer or image forming apparatus, and thus may be variously set in accordance with the performance of a printer or image forming apparatus. Also, when a preparation operation for forming the patterns is performed, the control unit 440 also drives the transfer belt 430 at the second speed. In this case, the preparation operation includes a printing preparation, printing a transfer belt cleaning device protection pattern, and idling the transfer belt 430 to remove noises caused by mechanical characteristics of the transfer belt 430 by controlling a rotating mechanism (structure) rotating the transfer belt 430 according to a control signal of the control unit 440 in response to the detected noises. Furthermore, if the noise detection unit 412 detects the noises from the transfer belt 430, the control unit 440 drives the transfer belt 430 at the first speed. As illustrated in FIG. 3D, the control unit 440 drives the transfer belt 430 at the first speed in the pattern forming section 325 in which the patterns are formed on the transfer belt 430, and drives the transfer belt 430 at the second speed in the non-pattern forming section 375.

Figure 5:
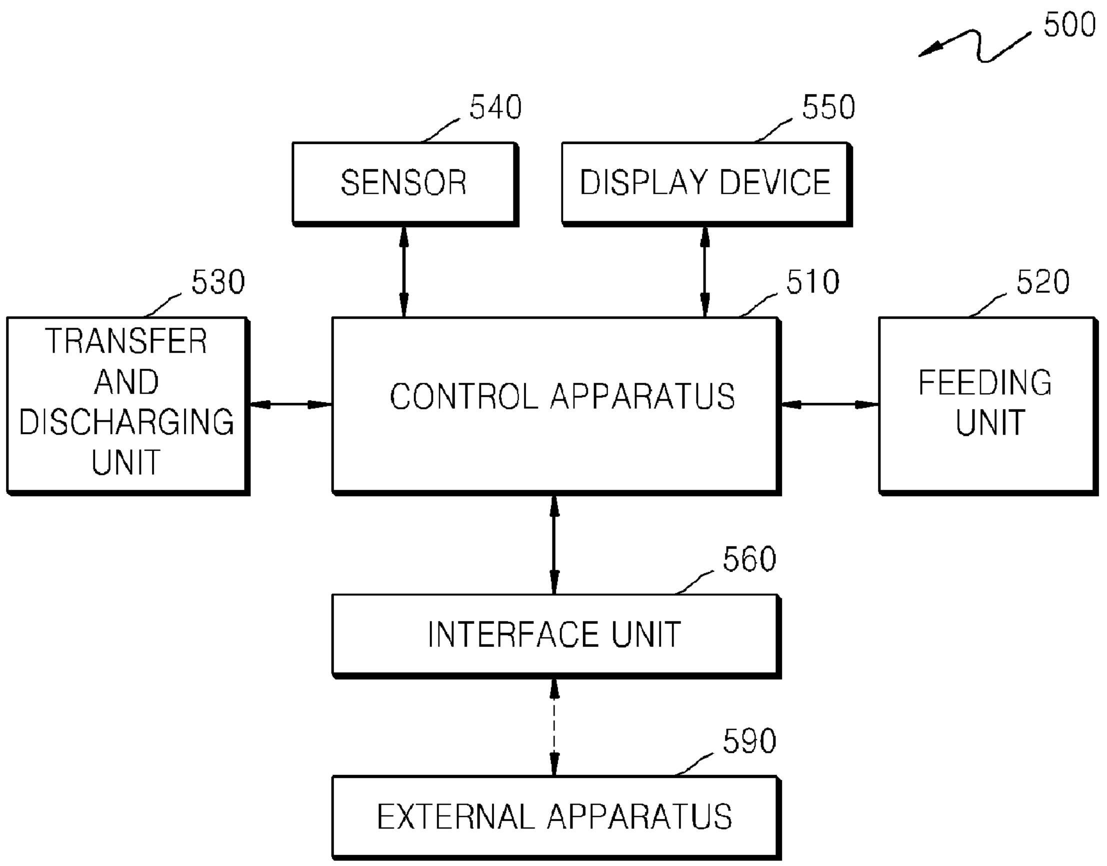
FIG. 5 is a diagram illustrating an image forming apparatus according to an embodiment of the present general inventive concept.

FIG. 5 illustrates an image forming apparatus 500 according to an embodiment of the present general inventive concept. The image forming apparatus 500 may include a control apparatus 510, a feeding unit 520, an image transfer/fixing/discharging unit 530, a sensor 540, a display device 550, and an interface unit 560. The image forming apparatus 500 may further include a conventional scanning device to scan an image from a document to save the scanned image in a memory connectable to the scanning device and the control apparatus 510.

The control apparatus 510 may be the transfer belt driving control apparatus 400 of FIG. 4. The control unit 440 of the control apparatus 510 may control operations of the feeding unit 520, the image transfer/fixing/discharging unit 530, the sensor 540, the display device 550, the interface unit 560, and other peripheral device mountable or connectable to the image forming apparatus 500. The feeding unit 520 picks up and feeds a printing medium toward the transfer belt 430 to receive one or more images from the transfer belt 430. The image transfer/fixing/discharging unit 530 transfers the image from the transfer belt 430 to the printing medium, fuses the transferred image on the printing medium, and discharges the printing medium outside the image forming apparatus. It is possible that the image transfer/fixing/discharging unit 530 may further include a double printing structure to feed back the printing medium to the transfer belt 430 such that another image can be formed on a second surface of the printing medium of which a first surface is form with an image. The sensor 540 may sense the patterns formed on the transfer belt 430 to be used the color registration correction. The control unit 440 of the control apparatus 510 can correct errors in the color registration. The display device 550 can be mountable or connectable to the image forming apparatus 400 to receive a signal from the control apparatus 510 to display an image representing a process of setting the image forming section, forming the patterns in the set image forming section, sensing the formed patterns, and correcting errors in color registration using the sensed patterns. The interface unit 560 communicates with an external device 590 to transmit or receive data through a wired or wireless communication line.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, color registration correction may be accurately performed in a short time, by setting a pattern forming section, in which patterns for the color registration correction are able to be formed, and a non-pattern forming section, in which the patterns are not able to be formed, on a transfer belt in which the patterns are formed; performing the color registration correction by driving the transfer belt at a first speed in the pattern forming section; and driving the transfer belt at a second speed, which is faster than the first speed, in the non-pattern forming section.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A transfer belt driving control method for color registration correction, comprising:

setting a pattern forming section, in which patterns for the color registration correction are able to be formed, and a non-pattern forming section, in which the patterns are not able to be formed, on a transfer belt in which the patterns are formed;

performing the color registration correction by driving the transfer belt at a first speed in the pattern forming section; and driving the transfer belt at a second speed, which is faster than the first speed, in the non-pattern forming section.

2. The transfer belt driving control method of claim 1, wherein the setting of the pattern forming section comprises:

detecting at least one noise from the transfer belt;

comparing positions of the noises to a position of a section required to form the patterns; and setting a section in which the patterns are able to be formed, as the pattern forming section, in accordance with the comparison result.

3. The transfer belt driving control method of claim 2, wherein, if the noises do not exist on the transfer belt, the setting of the pattern forming section comprises setting a whole section of the transfer belt as the pattern forming section.

4. The transfer belt driving control method of claim 2, wherein, if two or more sections in which the patterns are able to be formed exist, the setting of the pattern forming section comprises setting a section that is selected by a user or a section that is disposed at a front position of the transfer belt, as the pattern forming section.

5. The transfer belt driving control method of claim 2, wherein the detecting of the noises from the transfer belt comprises detecting the noises from the transfer belt by driving the transfer belt at the first speed.

6. The transfer belt driving control method of claim 2, wherein the noises are formed on a surface of the transfer belt due to mechanical characteristics of the transfer belt, are not distinguished from the patterns when the noises are detected, and thus disturb the performing of the color registration correction.

7. The transfer belt driving control method of claim 1, further comprising performing a preparation operation for forming the patterns by driving the transfer belt at the second speed.

8. The transfer belt driving control method of claim 7, wherein the preparation operation is one of cleaning of the transfer belt, applying of a high voltage to the transfer belt, printing of a transfer belt cleaning device protection pattern, and idling of the transfer belt for removing noises caused by mechanical characteristics of the transfer belt.

9. The transfer belt driving control method of claim 1, further comprising displaying the pattern forming section, the non-pattern forming section, and a driving speed of the transfer belt in each section.

10. A computer-readable medium to contain computer-readable codes as a program to perform a method of an image forming apparatus, the method comprising:

setting a pattern forming section, in which patterns for the color registration correction are able to be formed, and a non-pattern forming section, in which the patterns are not able to be formed, on a transfer belt in which the patterns are formed;

performing the color registration correction by driving the transfer belt at a first speed in the pattern forming section; and driving the transfer belt at a second speed, which is faster than the first speed, in the non-pattern forming section.

11. A transfer belt driving control apparatus for color registration correction, comprising:

a pattern forming section setting unit to set a pattern forming section, in which patterns for the color registration correction are able to be formed, and a non-pattern forming section, in which the patterns are not able to be formed, on a transfer belt in which the patterns are formed;

image forming units to form the patterns in the pattern forming section; and a control unit to drive the transfer belt at a first speed when the image forming units form the patterns in the pattern forming section, and driving the transfer belt at a second speed in the non-pattern forming section.

12. The transfer belt driving control apparatus of claim 11, wherein the pattern forming section setting unit comprises:

a noise detection unit detecting at least one noise from the transfer belt;

a comparison unit comparing positions of the noises to a position of a section required to form the patterns; and a first setting unit setting a section in which the patterns are able to be formed, as the pattern forming section, in accordance with the comparison result.

13. The transfer belt driving control apparatus of claim 12, wherein, if the noises do not exist on the transfer belt, the pattern forming section setting unit sets a whole section of the transfer belt as the pattern forming section.

14. The transfer belt driving control apparatus of claim 12, wherein, if two or more sections in which the patterns are able to be formed exist, the pattern forming section setting unit sets a section that is selected by a user or a section that is disposed at a front position of the transfer belt, as the pattern forming section.

15. The transfer belt driving control apparatus of claim 12, wherein the control unit drives the transfer belt at the first speed when the noise detection unit detects the noises from the transfer belt.

16. The transfer belt driving control apparatus of claim 12, wherein the noises are formed on a surface of the transfer belt due to mechanical characteristics of the transfer belt, are not distinguished from the patterns when the noises are detected, and thus disturb the performing of the color registration correction.

17. The transfer belt driving control apparatus of claim 11, wherein the control unit drives the transfer belt at the second speed when the transfer belt driving control apparatus performs a preparation operation for forming the patterns.

18. The transfer belt driving control apparatus of claim 17, wherein the preparation operation is one of cleaning of the transfer belt, applying of a high voltage to the transfer belt, printing of a transfer belt cleaning device protection pattern, and idling of the transfer belt for removing noises caused by mechanical characteristics of the transfer belt.

19. The transfer belt driving control apparatus of claim 11, further comprising a display unit displaying the pattern forming section, the non-pattern forming section, and a driving speed of the transfer belt in each section.

* * * * *